United States Patent [19]

Weber et al.

[11] Patent Number: 4,655,430
[45] Date of Patent: Apr. 7, 1987

[54] PASTRY MOULD WITH MOVABLE RIMS

[76] Inventors: Dolores Weber; Vincent Weber, both of 257, Chemin de la Garrigue, 83300 Draguignan, France

[21] Appl. No.: 694,558
[22] PCT Filed: May 10, 1983
[86] PCT No.: PCT/FR83/00089
§ 371 Date: Dec. 18, 1984
§ 102(e) Date: Dec. 18, 1984
[87] PCT Pub. No.: WO84/04231
PCT Pub. Date: Nov. 8, 1984

[30] Foreign Application Priority Data

May 4, 1983 [FR] France ................. 83 07562

[51] Int. Cl.$^4$ ............................................. B29C 33/26
[52] U.S. Cl. ...................................... 249/172; 99/432; 99/DIG. 15; 249/135
[58] Field of Search ............ 249/66 R, 135, 170, 249/172, 55, 134, 139, 171, DIG. 1; 99/426, 428, 430, 432, 433, DIG. 15; 294/141, 143, 169, 172; D7/43, 44, 70, 76, 83, 354; 43/88

[56] References Cited

U.S. PATENT DOCUMENTS

| 667,906 | 2/1901 | Hanchett | 294/169 |
|---|---|---|---|
| 691,463 | 1/1902 | Grote | 249/172 |
| 804,122 | 11/1905 | Hayes | 249/170 |
| 1,527,034 | 2/1925 | Durrin | 43/88 |
| 1,862,580 | 6/1932 | Pneuman | 43/88 |
| 2,081,080 | 6/1936 | Baker | 249/170 |
| 2,334,595 | 11/1943 | Bailey | 294/169 |
| 2,598,710 | 6/1952 | Murphy | 294/169 |
| 2,682,725 | 7/1954 | Atwood | 249/55 |
| 3,356,044 | 12/1967 | Keathley et al. | 425/443 |
| 4,117,965 | 10/1978 | Rienzo | 294/172 |

FOREIGN PATENT DOCUMENTS

| 463519 | 2/1914 | France | 249/170 |
|---|---|---|---|
| 2041948 | 2/1971 | France . | |
| 753068 | 7/1956 | United Kingdom . | |

Primary Examiner—Jay H. Woo
Assistant Examiner—James C. Housel
Attorney, Agent, or Firm—William A. Drucker

[57] ABSTRACT

A pastry mould, permitting even cooking and easy removal of the cooked contents of the mould, has a flat base with two upstanding tongues spaced apart and positioned opposite each other adjacent the periphery of the base, each such tongue carrying a pivot for two half portions of an enclosing rim, each half portion having its ends connected to a respective one of the tongues by the pivot thereon, such that the rim portions are each movable about the pivots into a position lying against the flat base, and into a position raised away from the base.

9 Claims, 12 Drawing Figures

PASTRY MOULD WITH MOVABLE RIMS

The present invention relates to a pastry mould permitting the easy removal of the cooked contents of the mould and giving even cooking. In the known devices of this kind the mould is composed of two parts, rim and base. The rim comprises an internal flange serving to receive the removable base.

INCONVENIENCES 1. for removal of the contents, there is thus a necessity to separate the base and the rim by lifting the base to permit the rim to fall.
2. with this delicate operation, there is a risk of burns and (or) of breaking of the product.
3. if the pastry sticks, there is no gap for the insertion of a blade or a spatula.
4. in certain moulds, there is a risk of deformation of the base and of the rim by lack of rigidity.
5. the cooking is irregular because of the fact that the pastry, by reason of the double flange of the edge of the base of the mould, does not rest perfectly flat in the mould.

According to the present invention a pastry mould comprises a flat base having two upstanding integral tongues thereon at spaced opposed positions adjacent to its periphery, each said tongue carrying a respective pivot, and an enclosing rim in two half portions, each said half portion having its ends connected to a respective one of the tongues by said pivot thereof, said rim portions each being movable about said pivots into a position lying against the flat base, and into a position raised away from the base. In a preferred arrangement, each upstanding tongue is positioned at a spacing inboard from the edge of the base. The tongues may be constituted by a portion of the base bent upwardly from the remainder of the base, and the base may have a respective notch, resulting from the bending up of each of the tongues, which either opens at the edge of the base or is bounded adjacent the edge of the base by a circumferential edge portion of the base. In another form of construction, each tongue comprises a foot portion positioned at a right angle to it, the foot extending towards the edge of the base and being welded to the base.

In yet another form of construction, each tongue is constituted by a flange portion of the base bent up with respect to the remainder of the base, and in a preferred form said flange portions are bent up along respective lines which are chords of the circular base.

Preferably, the half portions of the rim are each movable about the pivots into a position normal to the base, with one such half portion overlying the other half portion such that the two half portions together form a handle for the base serving as a tray.

BRIEF DESCRIPTION OF THE DRAWINGS

Three forms of construction of pastry mould in accordance with the invention are hereinafter described with reference to the figures of the accompanying drawings.

In the drawings.

DESCRIPTION OF THE PREFERRED EMBODIMENTS

Figure 1:
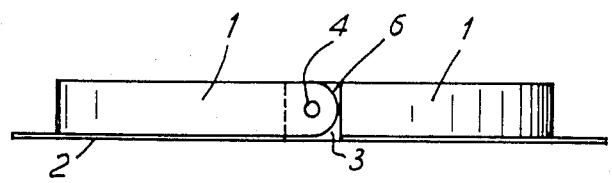
FIG. 1 is a side elevation of a first embodiment according to a first form of construction of the mould.
Figure 2:
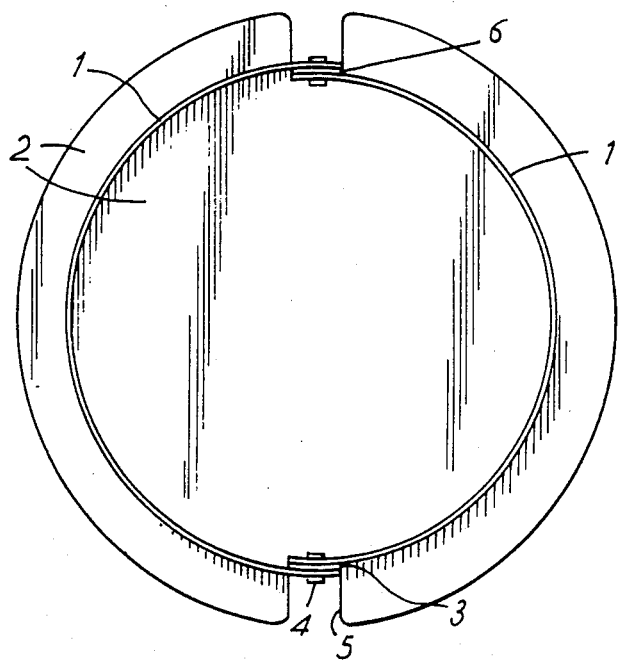
FIG. 2 is a plan view thereof.
Figure 3:
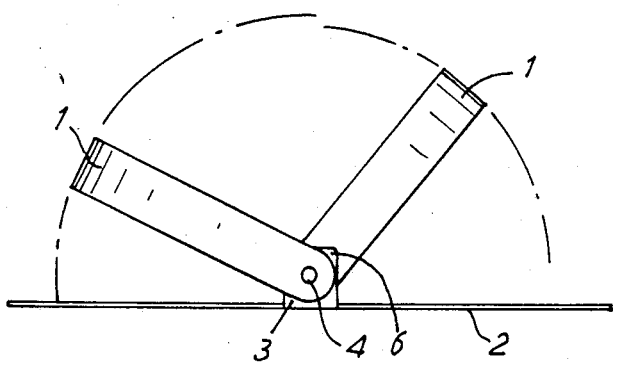
FIG. 3 is a side elevation thereof to show rim portions partially raised.
Figure 4:
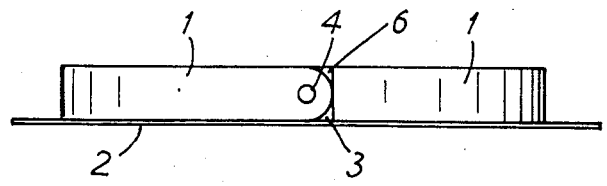
FIG. 4 is a side elevation of a second embodiment according to the first form of construction of the mould.
Figure 5:
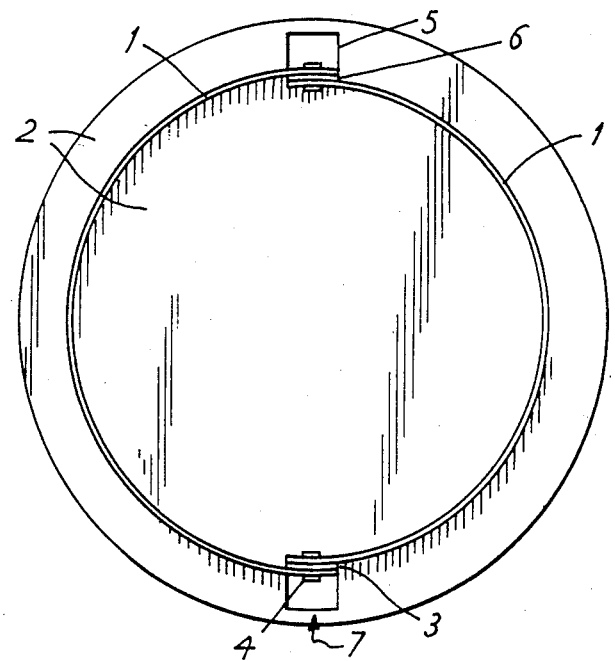
FIG. 5 is a plan view of the embodiment of FIG. 4.
Figure 6:
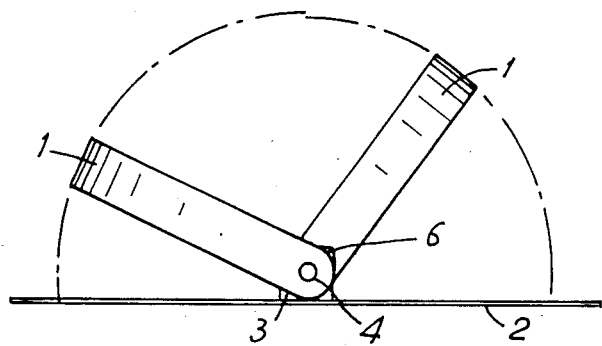
FIG. 6 is a side elevation of the embodiment of FIG. 4 to show rim portions partially raised.

According to a first manner of construction, seen in the respective embodiments of FIGS. 1-3 and 4-6, each securing system (3) comprises two notches (5) formed in the circular rim of the mould, forming an upstanding tongue (6) bent upwardly at spaced opposed positions and carrying a pivot (4). In FIGS. 1-3, the projecting edges of the notch are rounded. In FIGS. 4-6 the notches 5 are bounded by a circumferential edge (7).

Figure 7:
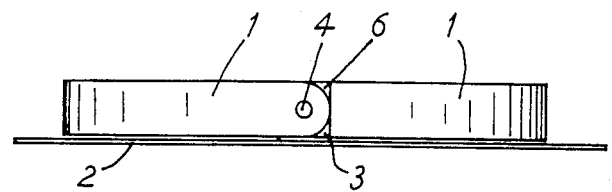
FIG. 7 is a side elevation of a second form of construction of the mould.
Figure 8:
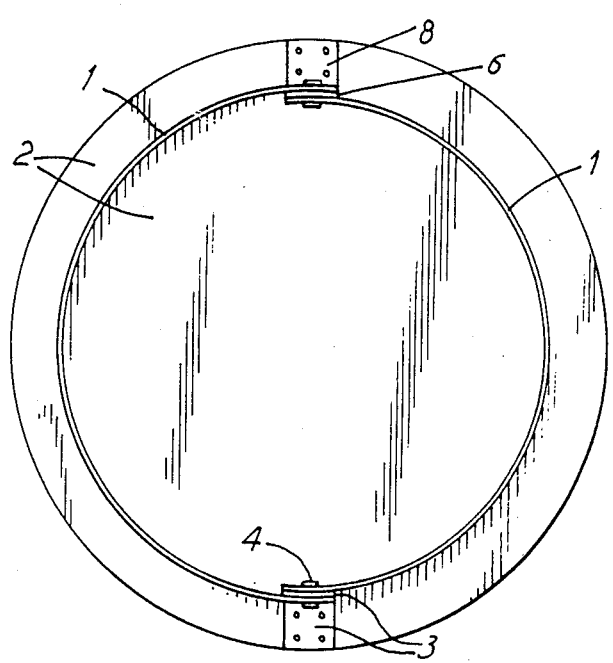
FIG. 8 is a plan view of the mould of FIG. 7.
Figure 9:
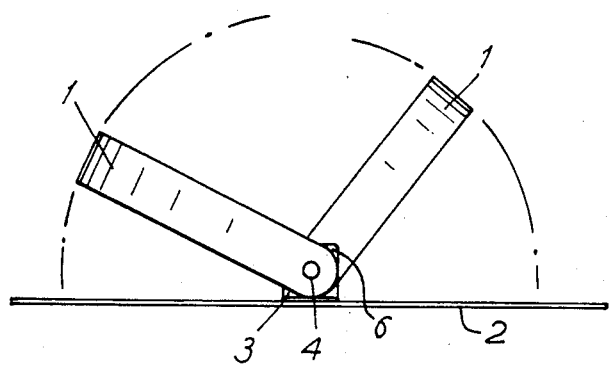
FIG. 9 is a side elevation of the mould of FIG. 7 to show rim portions partially raised.

According to a second manner of construction, seen in FIGS. 7-9, each securing system (3) comprises a tongue (6) bent up squarely, the foot (8) of which is connected be welding on the base of the mould (2). The welded foot is directed towards the exterior, as shown, but could alternatively be directed towards the interior of the base.

Figure 10:
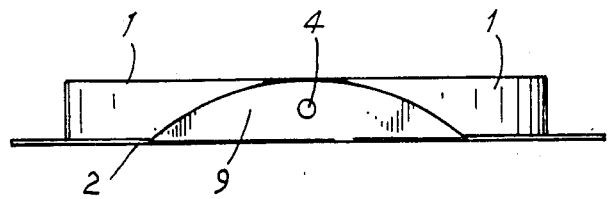
FIG. 10 is a side elevation of a third form of construction of the mould.
Figure 11:
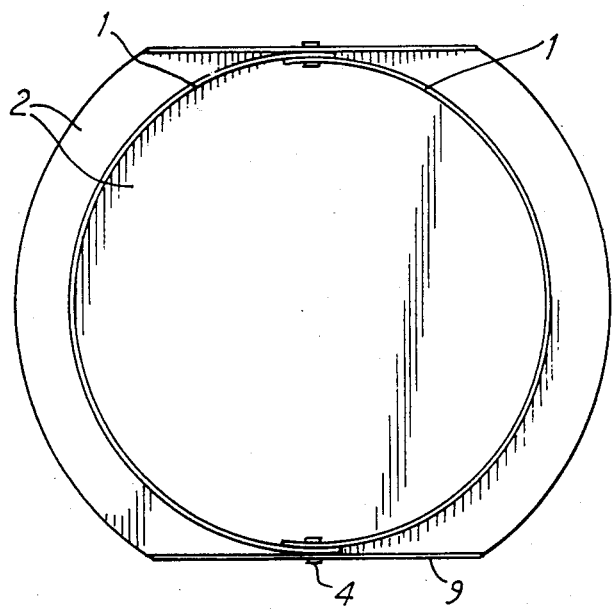
FIG. 11 is a plan view of the mould of FIG. 10.
Figure 12:
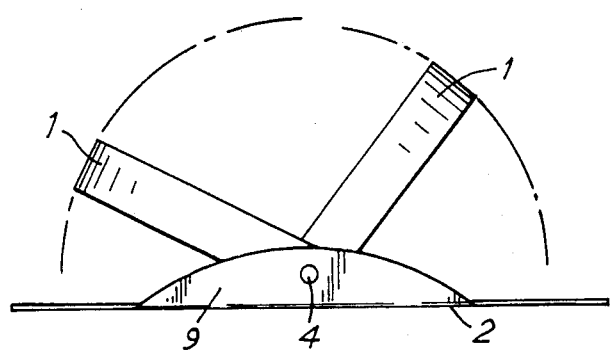
FIG. 12 is a side elevation of the mould of FIG. 10 to show rim portions partially raised.

According to a third manner of construction, seen in FIGS. 10-12, each securing system (3) comprises a bent edge or wing or flange portion (9) according to a chord of the plate forming the base (2) of the circular mould, the flanges (9) carrying the pivoting axes. The flanges (9) can be disposed at the exterior, or between, or at the interior of the rim portions, and can be perpendicular to the base of the mould, or slightly inclined.

The securing systems defined above adapt themselves to rigid material capable of withstanding high temperatures (copper, stainless steel, thick . . . ) For the other materials, blued sheet metal for example, which has a tendency to deform with heat, it is convenient to make the mould with the securing system proposed according to the third manner of construction, constituted by the folding, along a chord tangential to the movable rims at their pivots, of the part of the mould outside of this chord and piercing of the bent edges or wings (9) thus formed to receive the axes of pivoting. The height of the bend corresponds approximately to the height of the movable rims (1). The wings (9) serving for securing can be disposed vertically to the plane of the mould, or inclined towards the exterior in the case where the movable rims (1) are inclined towards the exterior. A system permitting the lateral uncoupling of the movable rim (1) prior to their lifting up can be provided. The system of mould with movable rims applies to all shapes (square, rectangular . . . ) The methods of use of the mould with movable rims are as follows:

The diameter of the base of the mould (for a round mould) represents that of the necessary pastry put down to line the mould. It is nevertheless necessary to give a quarter of a turn to the base of the mould in order to compensate for the bent part when the mould is not completely round or comprises notches.

The pastry resting properly flat in the base of the mould cooks evenly because the conduction of the heat is properly distributed.

In the course of cooking it is possible to lift the movable half-rims in order to further brown the edges of the tart. This last operation can be carried out to unstick the bottom of a tart which has stuck, with the aid of a spatula.

The removal of the cooked tart is carried out with one or two movable rims raised.

The mould with movable rims can be used as a tart plate, the two movable rims raised in the form of handles, perpendicularly to the base of the mould.

I claim:

1. A pastry mould comprising:
   (i) a flat base having two upstanding integral tongues thereon at spaced opposed positions adjacent the periphery of the flat base, each said tongue carrying a respective pivot means, and
   (ii) an enclosing rim in two half portions enclosing a continuous planar portion of said flat base, each said half portion having a pair of ends, each end being connected to a respective one of the tongues by said pivot means thereof, said rim portions each being movable about said pivot means into a position lying against the flat base, and into a position raised away from said base.

2. A pastry mould, as claimed in claim 1, wherein each upstanding tongue is positioned at a spacing inboard from the edge of the base.

3. A pastry mould, as claimed in claim 1, wherein each said tongue is constituted by a portion of said base bent upwardly from the remainder of the base.

4. A pastry mould, as claimed in claim 3, wherein said base comprises a respective notch, opening at the edge of the base, resulting from the bending up of each of said tongues.

5. A pastry mould, as claimed in claim 3, wherein said base comprises a respective notch resulting from the bending up of each of said tongues, each said notch being bounded, adjacent the edge of the base, by a circumferential edge portion of the base.

6. A pastry mould, as claimed in claim 1 wherein each said tongue comprises a foot portion positioned at a right angle to it, said foot extending towards the edge of the base and being welded to the base.

7. A pastry mould, as claimed in claim 1, wherein each said tongue is constituted by a flange portion of the base bent up with respect to the remainder of the base.

8. A pastry mould, as claimed in claim 7, wherein said base is circular, and wherein said flange portions are bent up along respective lines which are chords of the circular base.

9. A pastry mould, as claimed in claim 1, wherein said half portions of the rim are each movable about said pivot means into a position normal to the base with one such half portion overlying the other such half portion.

* * * * *